United States Patent [19]

Sorensen et al.

[11] Patent Number: 5,792,409

[45] Date of Patent: Aug. 11, 1998

[54] BALANCED MULTI-CAVITY INJECTION MOLDING OF CABLE TIES

[75] Inventors: Soren Christian Sorensen; Jens Ole Sorensen, both of Cayman, Cayman Islands

[73] Assignee: GB Electrical, Inc., Milwaukee, Wis.

[21] Appl. No.: 579,794

[22] Filed: Dec. 28, 1995

[51] Int. Cl.$^6$ ............................ B29C 45/26; B65D 63/00
[52] U.S. Cl. ........................... 264/297.2; 264/328.8; 425/572; 425/588; 24/16 PB
[58] Field of Search ..................... 264/40.1, 297.2, 264/328.7, 328.8; 425/145, 577, 572, 588, 185, 190, 195; 24/16 PB, 17 AP, 30.5 P

[56] References Cited

U.S. PATENT DOCUMENTS

| | | | |
|---|---|---|---|
| 3,924,299 | 12/1975 | McCormick | 24/16 PB |
| 4,473,524 | 9/1984 | Paradis | 264/291 |
| 5,015,426 | 5/1991 | Maus et al. | 425/555 |
| 5,146,654 | 9/1992 | Caveney et al. | 24/16 PB |
| 5,296,179 | 3/1994 | Kamiguchi et al. | 264/40.1 |
| 5,346,657 | 9/1994 | Hara et al. | 264/40.1 |
| 5,389,330 | 2/1995 | Sorensen et al. | 264/328.1 |
| 5,556,647 | 9/1996 | Abe et al. | 264/328.8 |

FOREIGN PATENT DOCUMENTS

| | | | |
|---|---|---|---|
| 539109 | 4/1993 | European Pat. Off. | 264/297.2 |
| 4204285 | 8/1993 | Germany | 264/297.2 |

OTHER PUBLICATIONS

Rosato et al., Injection Molding Handbook, pp. 169-183 and 250-254. 1986.

*Primary Examiner*—Jill L. Heitbrink
*Attorney, Agent, or Firm*—Edward W. Callan

[57] ABSTRACT

Balanced injection molding in a multi-cavity mold of a plurality of ties having a uniform maximum thickness between opposite broad sides of the tongue of the tie is accomplished by providing mold pieces in which the relative dimensions of projections for forming ratchet teeth on the tongue of the ties in different mold cavities are non-uniform such that when plastic material is injected into the mold cavities, the injected plastic material flows through the different mold cavities at respective flow rates that cause the mold cavities to be completely filled approximately simultaneously with the injected plastic material. In making the mold pieces, the dimensions of the projections initially are larger than required for forming ratchet teeth of a preferred dimension. After measuring the extent to which the different cavities are filled, the relative dimensions of the projections are adjusted such that the projections for at least one of the mold cavities are of a dimension required for forming ratchet teeth of the preferred dimension and/or such that the projections for at least one the mold cavities are of a dimension larger than required for forming ratchet teeth of the preferred dimension and the projections for at least another of the mold cavities are of a dimension smaller than required for forming ratchet teeth of the preferred dimension.

12 Claims, 2 Drawing Sheets

BALANCED MULTI-CAVITY INJECTION MOLDING OF CABLE TIES

BACKGROUND OF THE INVENTION

The present invention generally pertains to injection molding of ties that are useful for forming a loop for retaining a bundle of elongated articles, such as cables and is particularly directed to an improvement in multi-cavity injection molding of such ties. Such a tie is commonly known as a cable tie One type of tie includes an elongated tongue with two ends and two broad sides, a locking head at one end of the tongue, a tip at the other end of the tongue, a first set of ratchet teeth extending along one broad side of the tongue and a second set of ratchet teeth extending along the other broad side of the tongue, wherein the locking head has sides defining an opening for receiving the tip of the tongue. Referring to FIG. 1, the sides include a movable pawl 10 that is hinged at one side of the opening and an abutment surface 12 that is across the opening from the pawl. The pawl 10 has pawl teeth 14 disposed for engaging the first set of ratchet teeth 16 when the tip of the tongue 18 has been inserted through the opening with the first set of ratchet teeth facing 16 facing the pawl 10. When at least one pawl tooth 14 is so engaged, the pawl 10 is movable toward the abutment surface 12 in response to a pulling force applied to the tongue 18 in a direction opposite to the direction of insertion 20 in order to force the second set of ratchet teeth 22 against the abutment surface 12. Teeth 24 are disposed on the abutment surface 12 for engaging the second set of ratchet teeth 22 when the tip of the tongue 18 has been inserted through the opening with the second set of ratchet teeth 22 facing the abutment surface 12 and the side of the tongue including the second set of ratchet teeth 22 is forced against the abutment surface 12 by movement of the pawl 10. Such a tie is described in U.S. Pat. No. 4,473,524 to Paradis. Another type of tie differs from the tie described above in that it includes a set of ratchet teeth on only the broad side of the tongue that faces the pawl when the tongue is inserted through the locking head opening.

For efficient manufacture, it is preferred to injection mold ties simultaneously with a multi-cavity mold. A problem incident to multi-cavity injection molding of ties is that all of the cavities of the mold in which the ties are formed are not always completely filled simultaneously with the injected plastic material. Referring to FIG. 2, which illustrates a plurality of injection molded ties 26 formed in the cavities 28 of one mold piece 30 after the mold pieces defining the cavities have been separated, it is seen that failure to completely fill all of the mold cavities simultaneously results in some of the cavities 28a being incompletely filled, such that the ties 26a therein are not completely formed, and other cavities 28b being overfilled, such that a flashing of excess plastic 32 is attached to some of the ties 26b formed therein. The gates through which the plastic material is injected into the mold cavities 28 are located at the ends of the cavities 28 at which the locking heads 34 of the ties 26 are formed.

SUMMARY OF THE INVENTION

The present invention provides a method of balanced injection molding of a plurality of ties in a multi-cavity mold such that a plurality of mold cavities are completely filled approximately simultaneously with the injected plastic material. For injection molding a plurality of ties in a multi-cavity mold, wherein each of at least two mold cavities defines a tie comprising an elongated tongue with two ends and two broad sides, a locking head at one end of the tongue, a tip at the other end of the tongue, a first set of ratchet teeth extending along one broad side of the tongue and a second set of ratchet teeth extending along the other broad side of the tongue, wherein the locking head has sides defining an opening for receiving the tip of the tongue, the sides including a movable pawl that is hinged at one side of said opening and an abutment surface that is across the opening from the pawl, wherein the pawl has at least one pawl tooth disposed for locking engagement with the first set of ratchet teeth when the tip of the tongue has been inserted through said opening with the first set of ratchet teeth facing the pawl and wherein the abutment surface includes at least one tooth for locking engagement with the second set of ratchet teeth when the tongue has been inserted through the opening in such a direction that the second set of ratchet teeth face the abutment surface and the side of the tongue including the second set of ratchet teeth is forced against the abutment surface by movement of the pawl, the method comprise the steps of:

(a) providing mold pieces defining therebetween said at least two cavities for forming said ties having a uniform maximum thickness between the two broad sides of the ties, wherein at least one of the mold pieces includes projections for forming the ratchet teeth; and (b) injecting plastic material approximately simultaneously into at least both of said at least two mold cavities to form the ties;

wherein step (a) comprises providing mold pieces in which the relative dimensions of the projections for forming the first set of ratchet teeth and/or the second set of ratchet teeth in said at least two mold cavities are non-uniform such that when plastic material is injected in accordance with step (b) injected plastic material flows through said at least two mold cavities at respective flow rates that cause at least both of said at least two mold cavities to be completely filled approximately simultaneously with the injected plastic material.

The present invention also provides a multi-cavity mold for injection molding a plurality of ties, wherein each of at least two mold cavities defines a tie comprising an elongated tongue with two ends and two broad sides, a locking head at one end of the tongue, a tip at the other end of the tongue, a first set of ratchet teeth extending along one broad side of the tongue and a second set of ratchet teeth extending along the other broad side of the tongue, wherein the locking head has sides defining an opening for receiving the tip of the tongue, the sides including a movable pawl that is hinged at one side of said opening and an abutment surface that is across the opening from the pawl, wherein the pawl has at least one pawl tooth disposed for locking engagement with the first set of ratchet teeth when the tip of the tongue has been inserted through said opening with the first set of ratchet teeth facing the pawl and wherein the abutment surface includes at least one tooth for locking engagement with the second set of ratchet teeth when the tongue has been inserted through the opening in such a direction that the second set of ratchet teeth face the abutment surface and the side of the tongue including the second set of ratchet teeth is forced against the abutment surface by movement of the pawl, the mold comprising mold pieces defining therebetween said at least two cavities for forming said ties having a uniform maximum thickness between the two broad sides of the ties, wherein at least one of the mold pieces includes projections for forming the ratchet teeth; wherein the relative dimensions of the projections for forming the first set of ratchet teeth and/or the second set of ratchet teeth in said at least two mold cavities are non-uniform such that when plastic material is injected approximately simultaneously into at least both of said at least two mold cavities the injected plastic material flows through said at least two cavities at respective flow rates that cause at least both of said at least two mold cavities to be completely filled approximately simultaneously with the injected plastic material.

The present invention further provides a method of making a multi-cavity mold for injection molding a plurality of ties, wherein each of at least two mold cavities defines a tie comprising an elongated tongue with two ends and two broad sides, a locking head at one end of the tongue, a tip at the other end of the tongue, a first set of ratchet teeth extending along one broad side of the tongue and a second set of ratchet teeth extending along the other broad side of the tongue, wherein the locking head has sides defining an opening for receiving the tip of the tongue, the sides including a movable pawl that is hinged at one side of said opening and an abutment surface that is across the opening from the pawl, wherein the pawl has at least one pawl tooth disposed for locking engagement with the first set of ratchet teeth when the tip of the tongue has been inserted through said opening with the first set of ratchet teeth facing the pawl and wherein the abutment surface includes at least one tooth for locking engagement with the second set of ratchet teeth when the tongue has been inserted through the opening in such a direction that the second set of ratchet teeth face the abutment surface and the side of the tongue including the second set of ratchet teeth is forced against the abutment surface by movement of the pawl, the method comprising the steps of:

(a) providing mold pieces defining therebetween said at least two cavities for forming said ties having a uniform maximum thickness between the two broad sides of the ties, wherein at least one of the mold pieces includes projections for forming the ratchet teeth, with said projections being uniform for at least both of said at least two mold cavities;

(b) injecting plastic material at a minimal injection pressure approximately simultaneously into at least both of said at least two mold cavities in order to form the ties and completely fill one of the cavities with the injected plastic material;

(c) measuring the relative extent to which said at least two mold cavities are filled with the injected plastic material; and (d) when at least both of said at least two mold cavities are not completely filled approximately simultaneously, adjusting the relative dimensions of the projections for forming the first set of ratchet teeth and/or the second set of ratchet teeth in at least both of said at least two mold cavities to be such that when plastic material is injected in accordance with step (b) injected plastic material flows through said at least two cavities at respective flow rates that cause at least both of said at least two mold cavities to be completely filled approximately simultaneously with the injected plastic material.

The forgoing aspects of the present invention also are applicable to multi-cavity injection molding of a plurality of cable ties in which ratchet teeth are provided on only one side of the tongue for engagement with the pawl.

Additional features of the present invention are described with reference to the detailed description of the preferred embodiments.

DETAILED DESCRIPTION

Figure 1:
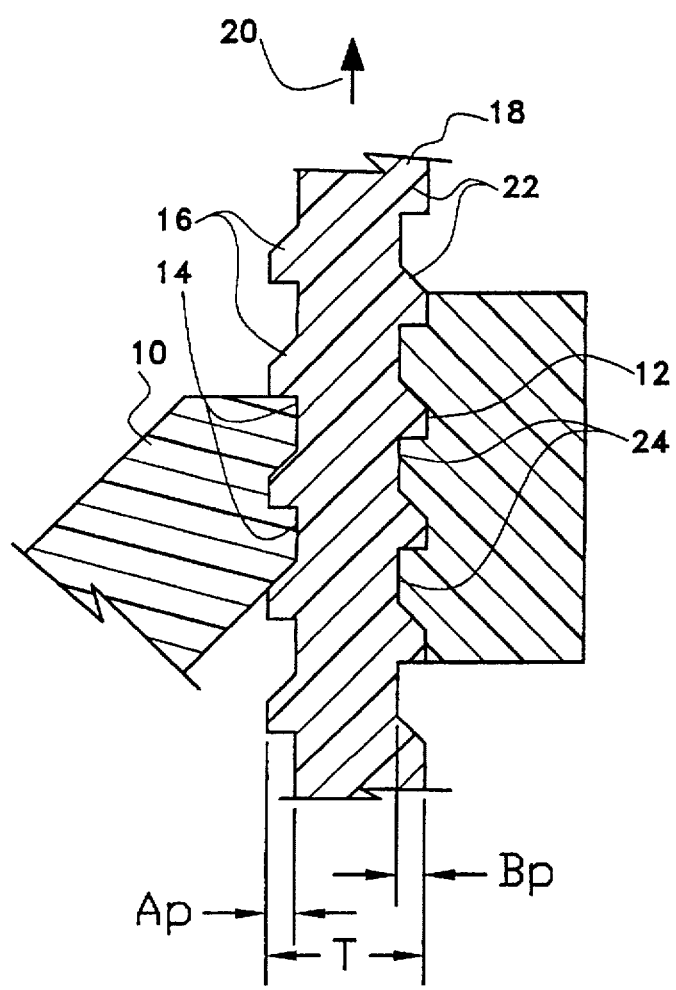
FIG. 1 is a sectional view showing preferred engagement of the ratchet teeth of a prior art tie with the pawl and the abutment surface within the locking head of the tie.
Figure 2:
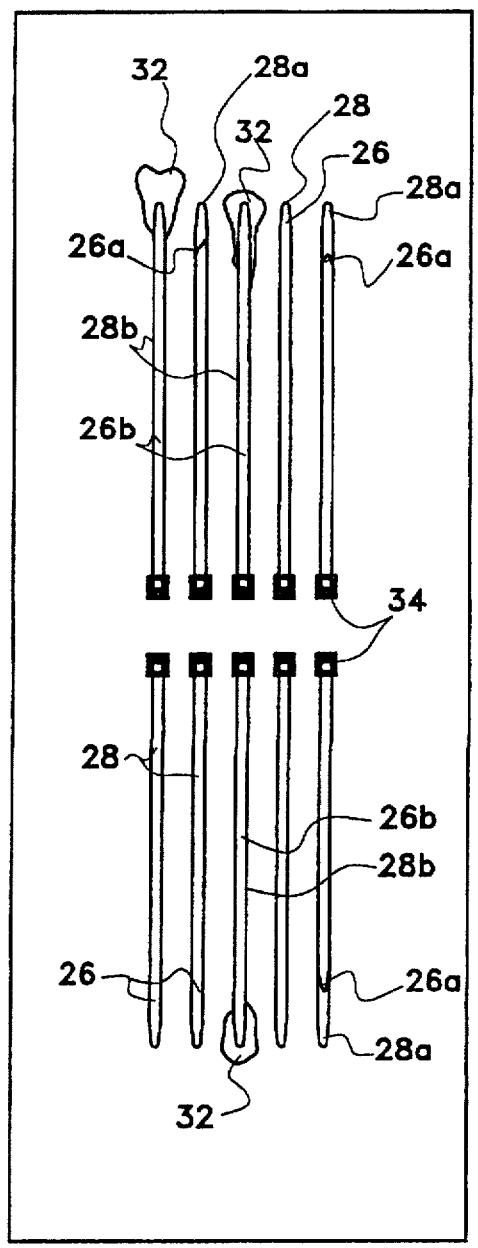
FIG. 2 illustrates a stage in a prior art multi-cavity injection molding method wherein a plurality of injection molded ties are in the cavities of one mold piece after the mold pieces defining the tie-forming cavities have been separated.

Referring to FIGS. 3, 3A, 4 and 4A, a preferred embodiment of the mold of the present invention includes at least two mold pieces 40, 42 defining therebetween at least two cavities 44, 46 for respectively forming ties 48, 50 having a uniform maximum thickness T between the two broad sides of the ties 48, 50. One of the mold pieces 40 includes projections 52 for forming the first set of ratchet teeth 16 that engage the pawl teeth 14. Another of the mold pieces 42 includes projections 54 for forming the second set of ratchet teeth 22 that engage the abutment surface teeth 24. The relative dimensions of the projections 52 for forming the first set of ratchet teeth 16 in the two mold cavities 44, 46 are non-uniform and/or the relative dimensions of the projections 54 for forming the second set of ratchet teeth 22 in the two mold cavities 44, 46 are non-uniform such that when plastic material is injected approximately simultaneously into both of the two mold cavities 44, 46 the injected plastic material flows through the two cavities 44, 46 at respective flow rates that cause both of the two mold cavities 44, 46 to be completely filled approximately simultaneously with the injected plastic material.

Figure 3:
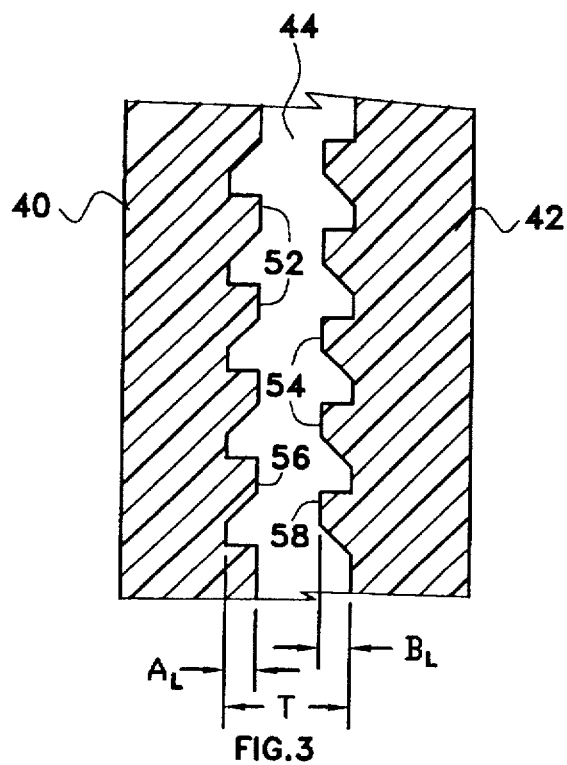
FIG. 3 is a sectional view of one portion of a mold defining a portion of one mold cavity for forming the ratchet teeth of one tie in a multi-cavity mold in accordance with the present invention.
Figure 3A:
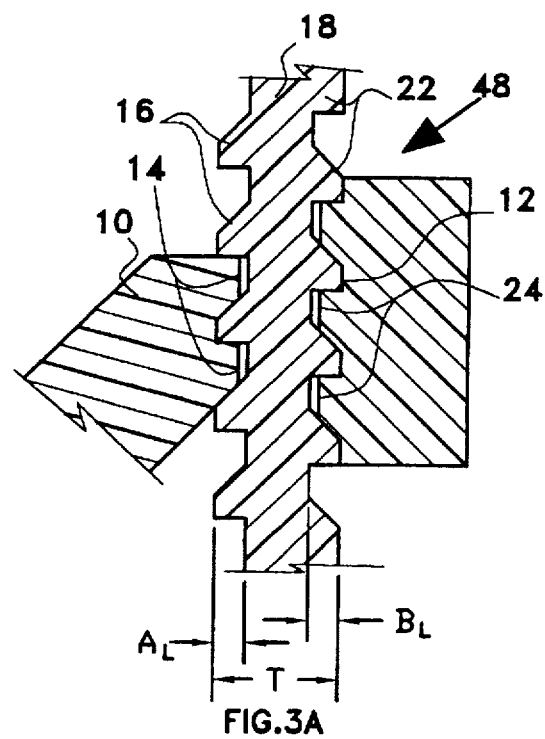
FIG. 3A is a sectional view showing the engagement of the pawl and the abutment surface with the ratchet-teeth portion of one tie formed with the portion of the mold shown in FIG. 3.
Figure 4:
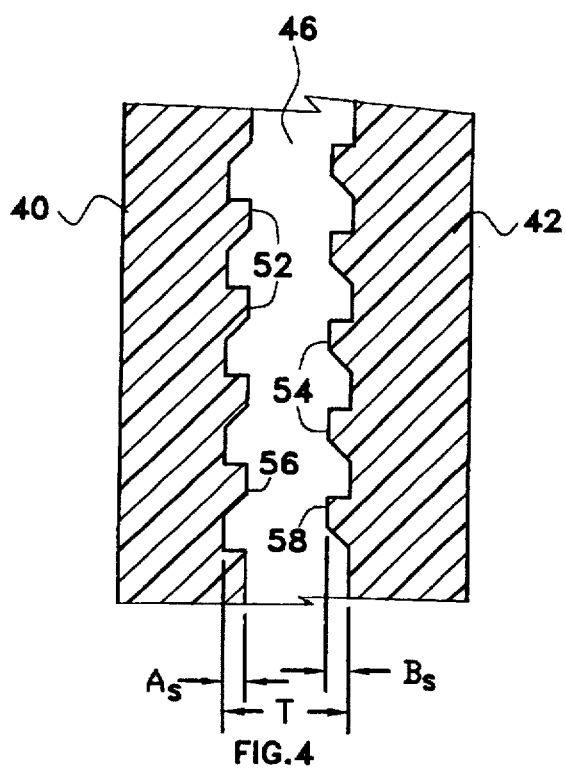
FIG. 4 is a sectional view of another portion of a mold defining a portion of another mold cavity for forming the ratchet teeth of another tie in a multi-cavity mold in accordance with the present invention.
Figure 4A:
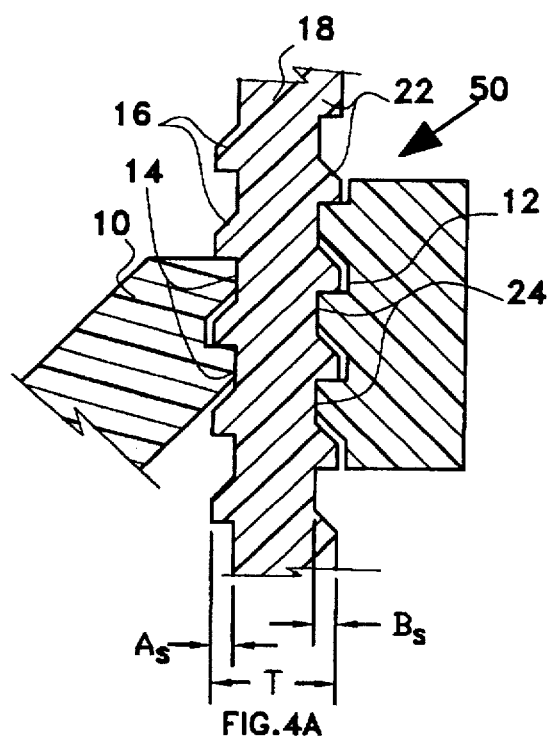
FIG. 4A is a sectional view showing the engagement of the pawl and the abutment surface with the ratchet-teeth portion of another tie formed with the portion of the mold shown in FIG. 4.

Referring to FIG. 1, it is seen that the first set of ratchet teeth 16 have a preferred depth $A_P$ and the second set of ratchet teeth 22 have a preferred depth $B_P$. In the portion of the mold shown in FIG. 3, the projections 52 of the one mold piece 40 have a depth dimension $A_L$ that is larger than required for forming a first set of ratchet teeth 16 having the preferred depth $A_P$, and the projections 54 of the other mold piece 42 have a depth dimension $B_L$ that is larger than required for forming a second set of ratchet teeth 22 having the preferred depth $B_P$; whereby the first set of ratchet teeth 16 have a depth $A_L$ that is larger than the preferred depth $A_P$ and the second set of ratchet teeth 22 have a depth $B_L$ that is larger than the preferred depth $B_P$, as shown in FIG. 3A In the portion of the mold shown in FIG. 4, the projections 52 of the one mold piece 40 have a depth dimension $A_S$ that is smaller than required for forming a first set of ratchet teeth 16 having the preferred depth $A_P$, and the projections 54 of the other mold piece 42 have a depth dimension $B_S$ that is smaller than required for forming a second set of ratchet teeth 22 having the preferred depth $B_P$; whereby the first set of ratchet teeth 16 have a depth $A_S$ that is smaller than the preferred depth $A_P$ and the second set of ratchet teeth 22 have a depth $B_S$ that is smaller than the preferred depth $B_P$, as shown in FIG. 4A.

The relative differences between the depth dimensions $A_P$, $A_L$ and $A_S$ and the relative differences between the depth dimensions $B_P$, $B_L$ and $B_S$ are greatly exaggerated in the drawing. The actual differences in these depth dimensions is such that the strength of locking engagement between the ratchet teeth 16, 22 and the, respective pawl teeth 14 and abutment surface teeth 24 is not significantly affected even though the pawl teeth 14 do not extend to the full depth $A_L$ of the first set of ratchet teeth 16 when the depth $A_L$ of the first set of ratchet teeth 16 is larger than the preferred depth $A_P$ and the abutment surface teeth 24 do not extend to the full depth $B_L$ of the second set of ratchet teeth 22 when the depth $B_L$ of the second set of ratchet teeth 22 is larger than the preferred depth $B_P$, as shown in FIG. 3A and/or the first set of ratchet teeth 16 do not extend to the full depth of pawl teeth 14 when the depth $A_S$ of the first set of ratchet teeth 16 is smaller than the preferred depth $A_P$ and the second set of ratchet teeth 22 do not extend to the full depth of the abutment surface teeth 24 when the depth $B_S$ of the second set of ratchet teeth 22 is smaller than the preferred depth $B_P$, as shown in FIG. 4A.

In the preferred method of making the molds, the mold pieces that are provided initially define therebetween at least two cavities 44, 46 for forming ties 48, 50 having a uniform maximum thickness T between the two broad sides of the ties 48, 50, wherein each of the mold pieces 40, 42 includes projections 52, 54 for forming the ratchet teeth 16, 22, with the projections 52 for forming the first set of ratchet teeth 16 being uniform for at least both of the at least two mold cavities 44, 46 and with the projections 54 for forming the second set of ratchet teeth 22 being uniform for at least both of the at least two mold cavities 44, 46. Preferably, the projections 52, 54 have depth dimensions $A_L$, $B_L$, as shown in FIG. 3, that are larger than required for forming ratchet teeth 16, 22 of the preferred dimensions $A_P$, $B_P$ shown in FIG. 1.

Plastic material is then injected at a minimal injection pressure approximately simultaneously into at least both of the at least two mold cavities 44, 46 in order to form the ties 48, 50 and completely fill one of the cavities 44, 46 with the injected plastic material.

The relative extent to which the at least two mold cavities 44, 46 are filled with the injected plastic material is measured; and when at least both of the at least two mold cavities 44, 46 are not completely filled approximately simultaneously, the relative depth dimensions A, B of the projections 52, 54 for at least both of the at least two mold cavities 44, 46 are adjusted to be such that when plastic material is injected at a minimal injection pressure approximately simultaneously into at least both of the at least two mold cavities 44, 46, the injected plastic material flows through the at least two cavities 44, 46 at respective flow rates that cause at least both of the at least two mold cavities 44, 46 to be completely filled approximately simultaneously with the injected plastic material.

The depth dimensions A, B of the projections 52, 54 are adjusted by reducing the extensions of the tips 56, 58 of the respective projections 52, 54, with the tips 56 of all of the projections 52 for forming a first set of ratchet teeth 16 being reduced by a first uniform depth, and with extensions of the tips 58 of all of the projections 54 for forming a second set of ratchet teeth 22 being reduced by a second uniform depth, which may or may not be the same as the first uniform depth by which the tips 56 of the projections 54 are reduced. Alternatively the depths of only some of tips 56 and/or 58 of the projections 52 and/or 54 for forming one or more ties 48, 50 are reduced and/or such reduction is not necessarily uniform for all of the tips 56, 58 as to which the depth is reduced.

In alternative preferred embodiments, the depth of only either the tips 56 of the projections 52 that form the first set of ratchet teeth 16 or the tips 58 of the projections 54 that form the second set of ratchet teeth 22 are reduced.

Preferably, the dimensions of the projections 52 for forming the first set of ratchet teeth 16 and/or the dimensions of the projections 54 for forming the second set of ratchet teeth 22 are adjusted so that the projections 52 and/or 54 for at least one of the at least two mold cavities 44, 46 are of the dimensions required for forming ratchet teeth 16 and/or 22 of the preferred dimensions $A_P$ and/or $B_P$.

However, if such an adjustment doesn't result in the injected plastic material flowing through the at least two cavities 44, 46 at respective flow rates that cause the at least two mold cavities 44, 46 to be completely filled approximately simultaneously with the injected plastic material, the dimensions of the projections 52 for forming the first set of ratchet teeth 16 and/or the dimensions of the projections 54 for forming the second set of ratchet teeth 22 are adjusted so that the projections 52 and/or 54 for at least one of the at least two mold cavities 44, 46 are of a dimension $A_L$ and/or $B_L$ larger than required for forming ratchet teeth 16 and/or 22 of the preferred dimension $A_P$ and/or $B_P$ and so that the projections 52 and/or 54 for at least another of the at least two mold cavities 44, 46 are of a dimension $A_S$ and/or $B_S$ smaller than required for forming ratchet teeth 16 and/or 22 of the preferred dimension $A_P$ and/or $B_P$.

When such adjustments result in the injected plastic material flowing through the at least two cavities 44, 46 at respective flow rates that cause the at least two mold cavities 44, 46 to be completely filled approximately simultaneously with the injected plastic material, the multi-cavity mold is provided for balanced injection molding of a plurality of ties and plastic material is injected approximately simultaneously into at least both of the at least two mold cavities 44, 46 to form the ties 48, 50.

The advantages specifically stated herein do not necessarily apply to every conceivable embodiment of the present invention. Further, such stated advantages of the present invention are only examples and should not be construed as the only advantages of the present invention.

While the above description contains many specificities, these should not be construed as limitations on the scope of the present invention, but rather as exemplifications of the preferred embodiments described herein. Other variations are possible and the scope of the present invention should be determined not by the embodiments described herein but rather by the claims and their legal equivalents.

I claim:

1. A method of injection molding a plurality of ties in a multi-cavity mold, wherein each of at least two mold cavities defines a tie comprising an elongated tongue with two ends and two broad sides, a locking head at one end of the tongue, a tip at the other end of the tongue, a first set of ratchet teeth extending along one broad side of the tongue and a second set of ratchet teeth extending along the other broad side of the tongue, wherein the locking head has sides defining an opening for receiving the tip of the tongue, the sides including a movable pawl that is hinged at one side of said opening and an abutment surface that is across the opening from the pawl, wherein the pawl has at least one pawl tooth disposed for locking engagement with the first set of ratchet teeth when the tip of the tongue has been inserted through said opening with the first set of ratchet teeth facing the pawl and wherein the abutment surface includes at least one tooth for locking engagement with the second set of ratchet teeth when the tongue has been inserted through the opening in such a direction that the second set of ratchet teeth face the abutment surface and the side of the tongue including the second set of ratchet teeth is forced against the abutment surface by movement of the pawl, the method comprising the steps of:

(a) providing mold pieces defining therebetween said at least two cavities for forming said ties having a uniform maximum thickness between the two broad sides of the ties, wherein at least one of the mold pieces includes projections for forming the ratchet teeth; and (b) injecting plastic material approximately simultaneously into at least both of said at least two mold cavities to form the ties;

wherein step (a) comprises providing mold pieces in which the relative dimensions of the projections for forming the first set of ratchet teeth and/or the second set of ratchet teeth in said at least two mold cavities are non-uniform such that when plastic material is injected in accordance with step (b) injected plastic material flows through said at least two mold cavities at respective flow rates that cause at least both of said at least two mold cavities to be completely filled approximately simultaneously with the injected plastic material.

2. A method of injection molding a plurality of ties in a multi-cavity mold, wherein each of at least two mold cavities defines a tie comprising an elongated tongue with two ends and two broad sides, a locking head at one end of the tongue, a tip at the other end of the tongue, and a set of ratchet teeth extending along one broad side of the tongue, wherein the locking head has sides defining an opening for receiving the tip of the tongue, the sides including a movable pawl that is hinged at one side of said opening and an abutment surface that is across the opening from the pawl, wherein the pawl has at least one pawl tooth disposed for locking engagement with the set of ratchet teeth when the tip of the tongue has been inserted through said opening with the set of ratchet teeth facing the pawl, the method comprising the steps of:

(a) providing mold pieces defining therebetween said at least two cavities for forming said ties having a uniform maximum thickness between the two broad sides of the ties, wherein at least one of the mold pieces includes projections for forming the ratchet teeth; and (b) injecting plastic material approximately simultaneously into at least both of said at least two mold cavities to form the ties;

wherein step (a) comprises providing mold pieces in which the relative dimensions of the projections for said at least two mold cavities are non-uniform such that when plastic material is injected in accordance with step (b) injected plastic material flows through said at least two mold cavities at respective flow rates that cause at least both of said at least two mold cavities to be completely filled approximately simultaneously with the injected plastic material.

3. A method of making a multi-cavity mold for injection molding a plurality of ties, wherein each of at least two mold cavities defines a tie comprising an elongated tongue with two ends and two broad sides, a locking head at one end of the tongue, a tip at the other end of the tongue, a first set of ratchet teeth extending along one broad side of the tongue and a second set of ratchet teeth extending along the other broad side of the tongue, wherein the locking head has sides defining an opening for receiving the tip of the tongue, the sides including a movable pawl that is hinged at one side of said opening and an abutment surface that is across the opening from the pawl, wherein the pawl has at least one pawl tooth disposed for locking engagement with the first set of ratchet teeth when the tip of the tongue has been inserted through said opening with the first set of ratchet teeth facing the pawl and wherein the abutment surface includes at least one tooth for locking engagement with the second set of ratchet teeth when the tongue has been inserted through the opening in such a direction that the second set of ratchet teeth face the abutment surface and the side of the tongue including the second set of ratchet teeth is forced against the abutment surface by movement of the pawl, the method comprising the steps of:

(a) providing mold pieces defining therebetween said at least two cavities for forming said ties having a uniform maximum thickness between the two broad sides of the ties, wherein at least one of the mold pieces includes projections for forming the ratchet teeth, with said projections being uniform for at least both of said at least two mold cavities;

(b) injecting plastic material at a minimal injection pressure approximately simultaneously into at least both of said at least two mold cavities in order to form the ties and completely fill one of the cavities with the injected plastic material;

(c) measuring the relative extent to which said at least two mold cavities are filled with the injected plastic material; and (d) when at least both of said at least two mold cavities are not completely filled approximately simultaneously, adjusting the relative dimensions of the projections for forming the first set of ratchet teeth and/or the second set of ratchet teeth in at least both of said at least two mold cavities to be such that when plastic material is injected in accordance with step (b) injected plastic material flows through said at least two cavities at respective flow rates that cause at least both of said at least two mold cavities to be completely filled approximately simultaneously with the injected plastic material.

4. A method according to claim 3, wherein step (a) comprises the step of (e) providing said mold pieces including said projections having dimensions that are larger than required for forming ratchet teeth of a preferred dimension.

5. A method according to claim 4, wherein step (d) comprises the step of:

(f) adjusting the dimensions of the projections so that the projections for at least one of said at least two mold cavities are of a dimension required for forming ratchet teeth of the preferred dimension.

6. A method according to claim 4, wherein step (d) comprises the step of:

(f) adjusting the dimensions of the projections so that the projections for at least one of said at least two mold cavities are of a dimension larger than required for forming ratchet teeth of the preferred dimension and the projections for at least another of said at least two mold cavities are of a dimension smaller than required for forming ratchet teeth of the preferred dimension.

7. A method of making a multi-cavity mold for injection molding a plurality of ties, wherein each of at least two mold cavities defines a tie comprising an elongated tongue with two ends and two broad sides, a locking head at one end of the tongue, a tip at the other end of the tongue, and a set of ratchet teeth extending along one broad side of the tongue, wherein the locking head has sides defining an opening for receiving the tip of the tongue, the sides including a movable pawl that is hinged at one side of said opening and an abutment surface that is across the opening from the pawl, wherein the pawl has at least one pawl tooth disposed for locking engagement with the set of ratchet teeth when the tip of the tongue has been inserted through said opening with the set of ratchet teeth facing the pawl, the method comprising the steps of:

(a) providing mold pieces defining therebetween said at least two cavities for forming said ties having a uniform maximum thickness between the two broad sides of the ties, wherein at least one of the mold pieces includes projections for forming the ratchet teeth, with said projections being uniform for at least both of said at least two mold cavities;

(b) injecting plastic material at a minimal injection pressure approximately simultaneously into at least both of said at least two mold cavities in order to form the ties and completely fill one of the cavities with the injected plastic material;

(c) measuring the relative extent to which said at least two mold cavities are filled with the injected plastic material; and (d) when at least both of said at least two mold cavities are not completely filled approximately simultaneously, adjusting the relative dimensions of the projections for at least both of said at least two mold cavities to be such that when plastic material is injected in accordance with step (b) injected plastic material flows through said at least two cavities at respective flow rates that cause at least both of said at least two mold cavities to be completely filled approximately simultaneously with the injected plastic material.

8. A method according to claim 7, wherein step (a) comprises the step of:

(e) providing said mold pieces including said projections having dimensions that are larger than required for forming ratchet teeth of a preferred dimension.

9. A method according to claim 8, wherein step (d) comprises the step of:

(f) adjusting the dimensions of the projections so that the projections for at least one of said at least two mold cavities are of a dimension required for forming ratchet teeth of the preferred dimension.

10. A method according to claim 8, wherein step (d) comprises the step of (f) adjusting the dimensions of the projections so that the projections for at least one of said at least two mold cavities are of a dimension larger than required for forming ratchet teeth of the preferred dimension and the projections for at least another of said at least two mold cavities are of a dimension smaller than required for forming ratchet teeth of the preferred dimension.

11. A multi-cavity mold for injection molding a plurality of ties, wherein each of at least two mold cavities defines a tie comprising an elongated tongue with two ends and two broad sides, a locking head at one end of the tongue, a tip at the other end of the tongue, a first set of ratchet teeth extending along one broad side of the tongue and a second set of ratchet teeth extending along the other broad side of the tongue, wherein the locking head has sides defining an opening for receiving the tip of the tongue, the sides including a movable pawl that is hinged at one side of said opening and an abutment surface that is across the opening from the pawl, wherein the pawl has at least one pawl tooth disposed for locking engagement with the first set of ratchet teeth when the tip of the tongue has been inserted through said opening with the first set of ratchet teeth facing the pawl and wherein the abutment surface includes at least one tooth for locking engagement with the second set of ratchet teeth when the tongue has been inserted through the opening in such a direction that the second set of ratchet teeth face the abutment surface and the side of the tongue including the second set of ratchet teeth is forced against the abutment surface by movement of the pawl, the mold comprising mold pieces defining therebetween said at least two cavities for forming said ties having a uniform maximum thickness between the two broad sides of the ties, wherein at least one of the mold pieces includes projections for forming the ratchet teeth;

wherein the relative dimensions of the projections for forming the first set of ratchet teeth and/or the second set of ratchet teeth in said at least two mold cavities are non-uniform such that when plastic material is injected approximately simultaneously into at least both of said at least two mold cavities the injected plastic material flows through said at least two cavities at respective flow rates that cause at least both of said at least two mold cavities to be completely filled approximately simultaneously with the injected plastic material.

12. A multi-cavity mold for injection molding a plurality of ties, wherein each of at least two mold cavities defines a tie comprising an elongated tongue with two ends and two broad sides, a locking head at one end of the tongue, a tip at the other end of the tongue, and a set of ratchet teeth extending along one broad side of the tongue, wherein the locking head has sides defining an opening for receiving the tip of the tongue, the sides including a movable pawl that is hinged at one side of said opening and an abutment surface that is across the opening from the pawl, wherein the pawl has at least one pawl tooth disposed for locking engagement with the set of ratchet teeth when the tip of the tongue has been inserted through said opening with the set of ratchet teeth facing the pawl, the mold comprising mold pieces defining therebetween said at least two cavities for forming said ties having a uniform maximum thickness between the two broad sides of the ties, wherein at least one of the mold pieces includes projections for forming the ratchet teeth;

wherein the relative dimensions of the projections for said at least two mold cavities are non-uniform such that when plastic material is injected approximately simultaneously into at least both of said at least two mold cavities the injected plastic material flows through said at least two cavities at respective flow rates that cause at least both of said at least two mold cavities to be completely filled approximately simultaneously with the injected plastic material.

* * * * *